United States Patent
Cresswell et al.

(10) Patent No.: US 9,579,759 B2
(45) Date of Patent: Feb. 28, 2017

(54) METHOD AND APPARATUS FOR FORMING THIN DISCS

(71) Applicant: ROLLS-ROYCE PLC, London (GB)

(72) Inventors: Jonathan Cresswell, Bristol (GB); Toby David Davis, Chichester (GB); Jonathan Alexander Elvidge, Bristol (GB); Anusan Sugumaar, Wembley (GB)

(73) Assignee: ROLLS-ROYCE plc, London (GB)

(*) Notice: Subject to any disclaimer, the term of this patent is extended or adjusted under 35 U.S.C. 154(b) by 216 days.

(21) Appl. No.: 14/514,713

(22) Filed: Oct. 15, 2014

(65) Prior Publication Data
US 2015/0128775 A1     May 14, 2015

(30) Foreign Application Priority Data

Nov. 12, 2013 (GB) .................................. 1319918.7

(51) Int. Cl.
*B23B 31/10* (2006.01)
*B23Q 3/12* (2006.01)
(Continued)

(52) U.S. Cl.
CPC ............... *B23Q 3/12* (2013.01); *B23B 25/00* (2013.01); *B23B 31/021* (2013.01); *B23B 31/10* (2013.01);
(Continued)

(58) Field of Classification Search
CPC ....... B23B 31/10; B23B 31/11; B23B 31/021; B23B 2210/04; B23B 25/00;
(Continued)

(56) References Cited

U.S. PATENT DOCUMENTS

| 1,475,907 | A | * | 11/1923 | Volman | ............... F16B 37/0864 269/173 |
| 2,409,590 | A | * | 10/1946 | Russell | ................. B23B 31/202 279/151 |

(Continued)

FOREIGN PATENT DOCUMENTS

| CN | 102350510 A | 2/2012 | |
| DE | 102 60 233 A1 | 7/2004 | |
| EP | 2 036 638 A1 | 3/2009 | |
| GB | 1360322 A * | 7/1974 | ............. B25B 5/102 |
| JP | H06-155117 A | 6/1994 | |
| JP | 2001-121413 A | 5/2001 | |

OTHER PUBLICATIONS

Jan. 31, 2014 Search Report issued in United Kingdom Application No. 1319918.7.

(Continued)

*Primary Examiner* — Sunil K Singh
*Assistant Examiner* — Ryan Rufo
(74) *Attorney, Agent, or Firm* — Oliff PLC

(57) ABSTRACT

A method of supporting a workpiece on a fixture, the workpiece having a first surface and an opposite second surface, and an aperture positioned at a center of the first surface and extending from the first surface to the second surface the fixture having a first end, an opposite second end, and a center portion, the center portion comprising a supporting surface, the second end being adapted to be mounted in a lathe, the supporting surface comprising an annular recess, the annular recess accommodating a supporting medium, the second surface of the workpiece being in intimate contact with the supporting medium, the method comprising the steps of:
(i) mounting the fixture in the lathe;
(ii) locating the aperture on the first end of the fixture; and
(iii) securing the workpiece on the fixture, with the second surface of the workpiece being coplanar with the supporting surface of the fixture.

7 Claims, 1 Drawing Sheet

(51) Int. Cl.
  *B23Q 3/08* (2006.01)
  *B23B 31/02* (2006.01)
  *B23B 25/00* (2006.01)
  *B23Q 3/06* (2006.01)

(52) U.S. Cl.
  CPC ............ *B23Q 3/065* (2013.01); *B23Q 3/084* (2013.01); *Y10T 29/49998* (2015.01); *Y10T 82/2593* (2015.01)

(58) Field of Classification Search
  CPC ....... Y10T 82/2593; Y10T 409/304312; B25B 1/2463; B25B 5/163; B23Q 3/12; B23Q 3/065; B23Q 3/084
  USPC ...... 269/289 R, 903, 271, 55, 37; 279/7, 99, 279/141, 143, 145, 151; 451/365, 381, 451/385, 397, 398, 402
  See application file for complete search history.

(56) References Cited

U.S. PATENT DOCUMENTS

| | | | | |
|---|---|---|---|---|
| 5,253,880 | A | * | 10/1993 | Won ........................ B23B 31/18 279/106 |
| 5,711,196 | A | | 1/1998 | Reid et al. |
| 6,086,976 | A | * | 7/2000 | Gardner .................. H01L 21/68 118/500 |
| 6,402,594 | B1 | * | 6/2002 | Kobayashi ........ H01L 21/02024 257/E21.23 |

OTHER PUBLICATIONS

Apr. 9, 2015 Search Report issued in European Patent Application No. 14 18 8726.

\* cited by examiner

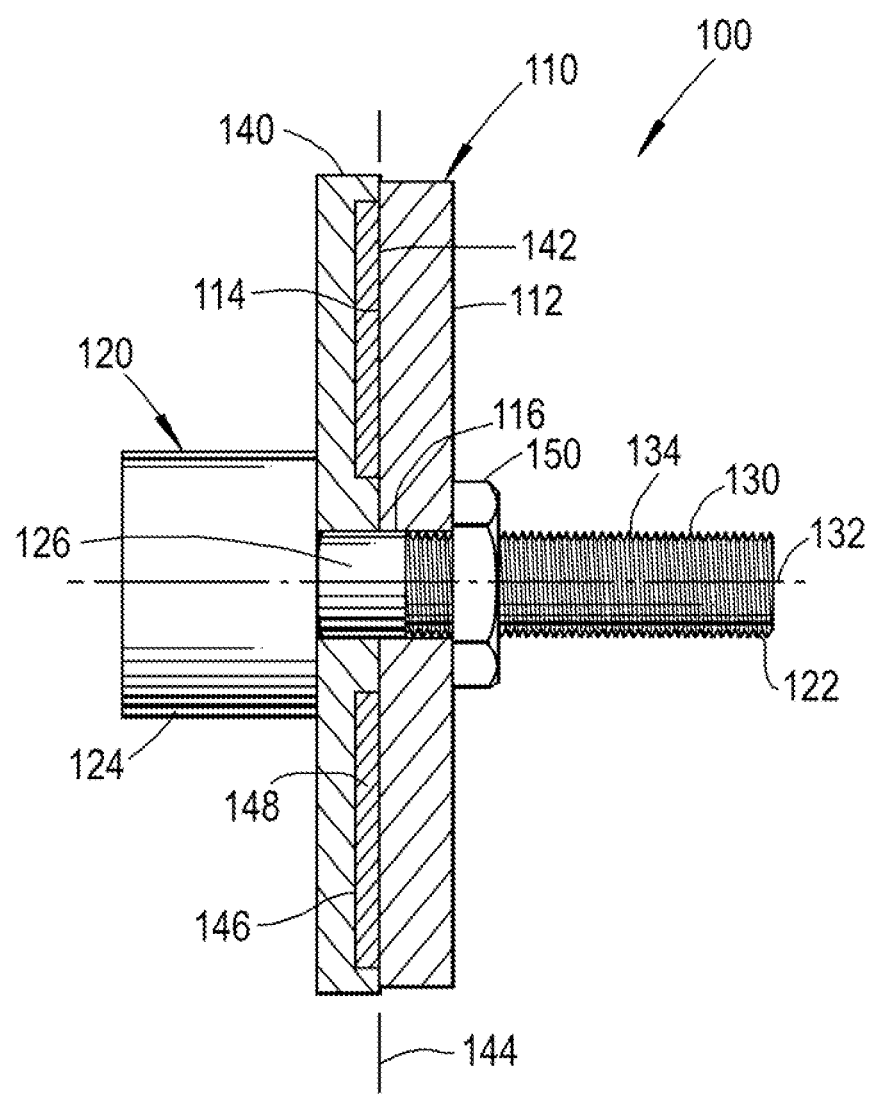

METHOD AND APPARATUS FOR FORMING THIN DISCS

This invention claims the benefit of UK Patent Application No. 1319918.7, filed on 12 Nov. 2013, which is hereby incorporated herein in its entirety.

FIELD OF THE INVENTION

The present invention relates to a method and apparatus for supporting a workpiece on a fixture, and particularly, but not exclusively, to a method and apparatus for supporting a workpiece on a fixture which is to be mounted in a lathe.

BACKGROUND TO THE INVENTION

The manufacture of axially thin components on a lathe or other turning centre is problematic due to the risk of the cutting tool producing unwanted deformation of the workpiece component. This results in dimensional inaccuracies in the finished component.

One solution to this problem is the use of a twin facing lathe in which two opposing axial faces of a thin component are machined simultaneously, with the two cutting tools being radially coincident with one another. In this way any unbalanced axial force caused by one cutting tool is balanced by a corresponding opposing force produced by the second opposing cutting tool.

One example of such a twin facing lathe is the Heynudisc™ machine produced by Heyligenstaedt GmbH (www.heyligenstaedt.de).

However, twin facing lathes, such as those produced by Heyligenstaedt GmbH are physically large and complex machines which are expensive to purchase, and their operation and maintenance requires skilled operatives.

STATEMENTS OF INVENTION

According to a first aspect of the present invention there is provided a method of supporting a workpiece on a fixture, the workpiece having a first surface and an opposite second surface, and an aperture positioned at a centre of the first surface and extending from the first surface to the second surface, the fixture having a body having a first end, opposite second end, and a centre portion, the first end comprising a spigot extending from the centre portion, the centre portion comprising a backing disc having a supporting surface, the plane of the supporting surface being normal to the axis of the spigot, the second end being adapted to be mounted in a lathe, the supporting surface comprising an annular recess, the annular recess accommodating a supporting medium, the second surface of the workpiece being in intimate contact with the supporting medium, the method comprising the steps of:
(i) mounting the fixture in the lathe;
(ii) locating the aperture on the first end of the fixture; and
(iii) securing the workpiece on the fixture, with the second surface of the workpiece being coplanar with the supporting surface of the fixture.

The method of the invention enables the manufacture of axially thin components, such as discs, on a conventional lathe. By eliminating the dependence on expensive twin facing lathe machinery, the manufacture of such components is both cheaper and easier to accomplish than prior art methods.

Optionally, step comprises the step of:
(iii)' clamping the workpiece on the fixture using a clamping element, with the second surface of the workpiece being coplanar with the supporting surface of the fixture.

An advantage of the second surface of the workpiece being coplanar with the supporting surface of the fixture is that the first surface of the workpiece, which is to be machined, is constrained in the axial direction. This makes the workpiece less prone to unwanted axial deformation which would compromise the dimensional accuracy of the finished workpiece.

Optionally, the method comprises the additional step of:
(iv) adhering the second surface of the workpiece to the supporting medium.

An advantage of adhering the second surface of the workpiece to the supporting medium is that the fixture can provide support to the workpiece in both the radial and circumferential directions. This further reduces the risk of unwanted deformation during the machining process making the method of the invention more convenient for a user.

Optionally, the supporting medium is a wax compound.

An advantage of using wax as the supporting medium is that is provides a damping effect to the workpiece during the manufacturing process. This further reduces the risk of unwanted deformation being experienced during the machining of the workpiece.

Optionally, the supporting medium is a composite resin.

An advantage of using a composite resin as the supporting medium is that the components of the resin can be chosen so as to reduce the solidification time for the supporting medium. This makes the method quicker to implement and therefore more convenient for a user.

Optionally, the workpiece is a rotationally symmetrical component.

The method of the invention is advantageously suited to rotationally symmetrical components because such component geometries are more easily accommodated in a lathe.

In alternative arrangements, the workpiece may be a rotational asymmetrical component which may require additional configuration during setup in order to ensure the workpiece assembly is balanced before commencing machining on the lathe.

Optionally, a diameter of the supporting surface is greater than a diameter of the workpiece.

This ensures that the entire second surface of the workpiece is supported by the backing plate which minimises the risk of unwanted deformation of the workpiece during the machining process.

In an alternative arrangement, a diameter of the supporting surface is less than a diameter of the workpiece. In such an arrangement, the fixture can be made smaller and therefore less costly. However, there is an increased risk of the workpiece experiencing unwanted deformation during the machining process.

According to a second aspect of the present invention there is provided a fixture for supporting a workpiece, the fixture comprising:
a body having a first end, an opposite second end, and a centre portion, the first end comprising a spigot extending from the centre portion, the second end being adapted to be mounted in a lathe, the centre portion comprising a backing disc, the backing disc having a supporting surface and an annular recess, the annular recess accommodating a supporting medium, the supporting medium providing the supporting surface, the plane of the supporting surface being normal to the axis of the spigot; and a clamping element, securable on the spigot to thereby clamp a workpiece against the supporting surface.

The fixture can conveniently be accommodated in any conventional lathe making its use simple and convenient for a user.

Optionally, the spigot comprises a threaded portion, and the damping element threadingly engages with the threaded portion.

In one arrangement, the damping element is a conventional threaded nut having a hexagonal circumference and capable of being fastened and unfastened using a spanner or wrench tool. Alternatively, the clamping element may have a slotted external circumference thus requiring the use of a C-spanner for fastening and unfastening.

Optionally, the backing disc is integrally formed with the fixture.

An advantage of integrally forming the backing disc with the fixture is that there are fewer separate component parts which in turn makes their use simpler and more convenient for a user.

Alternatively, the backing disc may be formed as a separate component from the body of the fixture. This enables a range of sizes of backing disc to be used interchangeably with the same body in order to accommodate different sized workpieces. This makes the fixture more convenient for a user.

By providing the supporting medium separately from the backing disc it is possible for the supporting medium to have different structural properties which would not necessarily be themselves suitable for maintaining the required structural integrity of the backing disc.

In an alternative arrangement, the annular recess may comprise a plurality of circumferentially arranged annular recesses.

Optionally, the supporting medium is a wax compound.

An advantage of using wax as the supporting medium is that is provides a damping effect to the workpiece during the manufacturing process. This further reduces the risk of unwanted deformation being experienced during the machining of the workpiece.

Optionally, the supporting medium is a composite resin.

An advantage of using a composite resin as the supporting medium is that the components of the resin can be chosen so as to reduce the solidification time for the supporting medium. This makes the method quicker to implement and therefore more convenient for a user.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawing:

FIG. 1 shows a schematic sectional view of a fixture according to an embodiment of the invention.

It is noted that the drawing may not be to scale. The drawing is intended to depict only typical aspects of the invention, and therefore should not be considered as limiting the scope of the invention.

DETAILED DESCRIPTION

Referring to FIG. 1, a fixture according to an embodiment of the invention is designated generally by the reference numeral 100.

The fixture 100 comprises a body 120 and a damping element 150. The body 120 comprises a first end 122, a second end 124 and a centre portion 126.

In the present arrangement, the body 120 and the damping element 150 are each formed from a steel alloy material. In alternative arrangements, the body 120 and the clamping element 150 may be formed from another metal or metal alloy.

In a further alternative, the body 120 and the clamping element may be formed from a composite material.

The first end 122 comprises a spigot 130 extending from the centre portion 126, the spigot 130 having an axis 132. The second end 124 of the body 120 is adapted to be mounted in a lathe (not shown). In the present arrangement, the second end 124 of the body 120 is formed as a cylindrical stub extending from the centre portion 126 in an opposite axial direction to the spigot 130.

In an alternative arrangement the second end 124 of the body 120 may be formed with a hexagonal circumferential surface to more easily facilitate its accommodation within a lathe.

The centre portion 126 comprises a backing disc 140. In the present arrangement the backing disc 140 is formed as a separate component from the body 120. Alternatively, the backing disc 140 may be integrally formed with the body 120. The backing disc 140 is formed from a steel alloy. In alternative arrangements the backing disc 140 may be formed from another metal or metal alloy, or from a composite material.

The backing disc 140 has a locating hole 141 and a supporting surface 142. In use, the locating hole 141 is positioned over the spigot 130 such that a plane 144 of the supporting surface 142 is normal to the axis 132 of the spigot 130.

The damping element 150 is securable on the spigot 130 to thereby clamp the workpiece 110 against the supporting surface 142. In the present arrangement, the clamping element 150 is formed as a nut with an internal threaded portion which threadingly engages with a threaded portion 134 of the spigot 130.

In an alternative arrangement, the clamping element 150 may comprise any conventional mechanical clamping element, such as an over-centre clamp or a tapered collet clamp.

The backing disc 140 comprises an annular recess 146 on the supporting surface 142. The annular recess 146 is filled with a supporting medium 148 such that the supporting medium 148 comprises the supporting surface 142.

In one arrangement the supporting medium 148 is a wax compound. Alternatively, the supporting medium may be a composite resin material.

In use, the fixture 100 is used to support a workpiece 110 having a first surface 112, an opposite second surface 114, and an aperture 116 positioned at a centre of the first surface 112.

The annular recess 146 of the backing disc 140 is filled with the supporting medium 148, and the backing disc 140 is positioned over the spigot 130, with the backing disc 140 located at the centre portion 125 of the body 120, and with the spigot 130 extending through the backing disc 140.

The workpiece 110 may then be located over the spigot 130 with the spigot 130 extending through the aperture 116 such that the second surface 114 of the workpiece 110 is coplanar with the supporting surface 142.

The clamping element 150 is then secured to the spigot 130 to clamp the workpiece 110 to the backing disc 140.

The fixture 100 may then be located in a lathe and the first surface 112 of the workpiece machined by the cutting tool(s) (not shown) of the lathe.

The foregoing description of the invention has been presented for the purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A fixture for supporting a workpiece in a lathe, the fixture comprising:
    a body having a first end, an opposite second end, and a centre portion, the first end comprising a spigot extending from the centre portion, the second end being adapted to be mounted in the lathe and having a larger diameter than the spigot, the centre portion comprising a backing disc, the backing disc having a supporting surface and a single annular recess, the single annular recess accommodating a supporting medium, the supporting medium providing the supporting surface, the plane of the supporting surface being normal to the axis of the spigot; and
    a clamping element, securable on the spigot to thereby clamp a workpiece against the supporting surface.

2. The fixture as claimed in claim 1, wherein the spigot comprises a threaded portion, and the clamping element threadingly engages with the threaded portion.

3. The fixture as claimed in claim 1, wherein the backing disc is integrally formed with the fixture.

4. The fixture as claimed in claim 3, wherein the workpiece is adhesively bonded to the supporting medium.

5. The fixture as claimed in claim 3, wherein the supporting medium is a composite resin.

6. The fixture as claimed in claim 1, whereby the workpiece has a first surface and an opposite second surface, and wherein the supporting surface completely accommodates the second surface of the workpiece.

7. The fixture as claimed in claim 6, wherein the diameter of the supporting surface is larger than the diameter of the second surface.

* * * * *